US012565316B2

(12) United States Patent
Woodington et al.

(10) Patent No.: US 12,565,316 B2
(45) Date of Patent: Mar. 3, 2026

(54) AIRCRAFT CABIN

(71) Applicants: Safran Seats GB Limited, Cwmbran (GB); Safran Seats, Plaisir (FR); Safran Aerosystems Mexico, Sociedad de Responsabilidad Limitada de Capital Variable, Chihuahua (MX)

(72) Inventors: James Byron Woodington, Cwmbran (GB); Jose Madrigal, Chihuahua (MX); Cristina Bermudez, Chihuahua (MX); Cho Kiu Heather Leung, Cwmbran (GB); Ryan Jones, Cwmbran (GB); Paul Hurstel, Plaisir (FR)

(73) Assignees: Safran Seats GB Limited, Cwmbran (GB); Safran Seats, Plaisir (FR); Safran Aerosystems Mexico, Sociedad de Responsabilidad Limitada de Capital Variable, Chihuahua (MX)

(*) Notice: Subject to any disclaimer, the term of this patent is extended or adjusted under 35 U.S.C. 154(b) by 303 days.

(21) Appl. No.: 17/635,691

(22) PCT Filed: Aug. 14, 2020

(86) PCT No.: PCT/GB2020/051943
§ 371 (c)(1),
(2) Date: Feb. 15, 2022

(87) PCT Pub. No.: WO2021/032954
PCT Pub. Date: Feb. 25, 2021

(65) Prior Publication Data
US 2022/0281605 A1     Sep. 8, 2022

(30) Foreign Application Priority Data
Aug. 16, 2019     (GB) ...................................... 1911773

(51) Int. Cl.
*B64D 11/06*          (2006.01)

(52) U.S. Cl.
CPC ...... *B64D 11/0601* (2014.12); *B64D 11/0606* (2014.12); *B64D 11/064* (2014.12); *B64D 11/0641* (2014.12)

(58) Field of Classification Search
CPC ... B64D 11/06; B64D 11/0639; B64D 11/064; B64D 11/0641
See application file for complete search history.

(56) References Cited

U.S. PATENT DOCUMENTS 6,669,141 B2 * 12/2003 Schmidt-Schaeffer ......................
B64D 11/06
244/118.6
8,876,202 B2 * 11/2014 Olliges .............. B64D 11/0604
297/344.21
(Continued)

FOREIGN PATENT DOCUMENTS

EP          0850834 A1      7/1998
EP          1211176 A1      6/2002
(Continued)

OTHER PUBLICATIONS

International Patent Application No. PCT/GB2020/051943, Invitation to Pay Additional Fees and, Where Applicable, Protest Fee and Partial International Search Report, dated Nov. 13, 2020.
(Continued)

*Primary Examiner* — Joshua J Michener
*Assistant Examiner* — Ryan Andrew Yankey
(74) *Attorney, Agent, or Firm* — Kilpatrick Townsend & Stockton LLP

(57)          ABSTRACT
The present invention provides an aircraft cabin comprising an aisle defining an aisle axis, a plurality of aircraft passenger seats arranged in a seat column adjacent the aisle, and accessible from the aisle, each aircraft passenger seat comprising a seat pan and a backrest with a front face defining a seat facing direction and a rear face, and each aircraft
(Continued)

passenger seat being convertible between a seat configuration and a bed configuration, wherein each aircraft passenger seat in the seat column is able to be angled away from the aisle such that the seat facing direction is at an angle of at least degrees from the aisle axis and wherein each aircraft passenger seat can be in the bed configuration when at that angle. The invention also provides an aircraft passenger accommodation unit, an aircraft, a kit of parts and a method of providing enhanced passenger access to an aircraft passenger accommodation unit.

13 Claims, 4 Drawing Sheets

(56) References Cited

U.S. PATENT DOCUMENTS

| | | | | |
|---|---|---|---|---|
| 10,501,188 | B2 * | 12/2019 | Nicholas | B64D 11/0601 |
| 10,858,108 | B2 * | 12/2020 | Bentley | B64D 11/0601 |
| 10,919,631 | B2 * | 2/2021 | Scoley | B64C 1/143 |
| 11,299,274 | B1 * | 4/2022 | Davis | B64D 11/0644 |
| 2006/0086864 | A1 | 4/2006 | Beroth | |
| 2008/0088160 | A1 * | 4/2008 | Johnson | B64D 11/06 |
| | | | | 297/344.21 |
| 2010/0109387 | A1 * | 5/2010 | Merensky | B64D 11/0601 |
| | | | | 297/340 |
| 2011/0156450 | A1 | 6/2011 | Collins et al. | |

FOREIGN PATENT DOCUMENTS

| | | | | | |
|---|---|---|---|---|---|
| GB | 2362095 | A | * 11/2001 | | B60N 2/14 |
| JP | 2011506177 | A | 3/2011 | | |
| JP | 2012501911 | A | 1/2012 | | |
| JP | 201 4525367 | A | 9/2014 | | |
| WO | 2003013903 | A1 | 2/2003 | | |
| WO | 2009077717 | A2 | 6/2009 | | |
| WO | 2013030797 | A1 | 3/2013 | | |
| WO | WO-2018078377 | A1 | * 5/2018 | | B64D 11/0601 |

OTHER PUBLICATIONS

International Patent Application No. PCT/GB2020/051943, International Search Report and Written Opinion, dated Jan. 20, 2021.
United Kingdom Patent Application No. 1911773.8, Search Report, dated Jan. 29, 2020.
Japan Patent Appl. No. 2022510099 Office Action, dated Feb. 21, 2024.

* cited by examiner

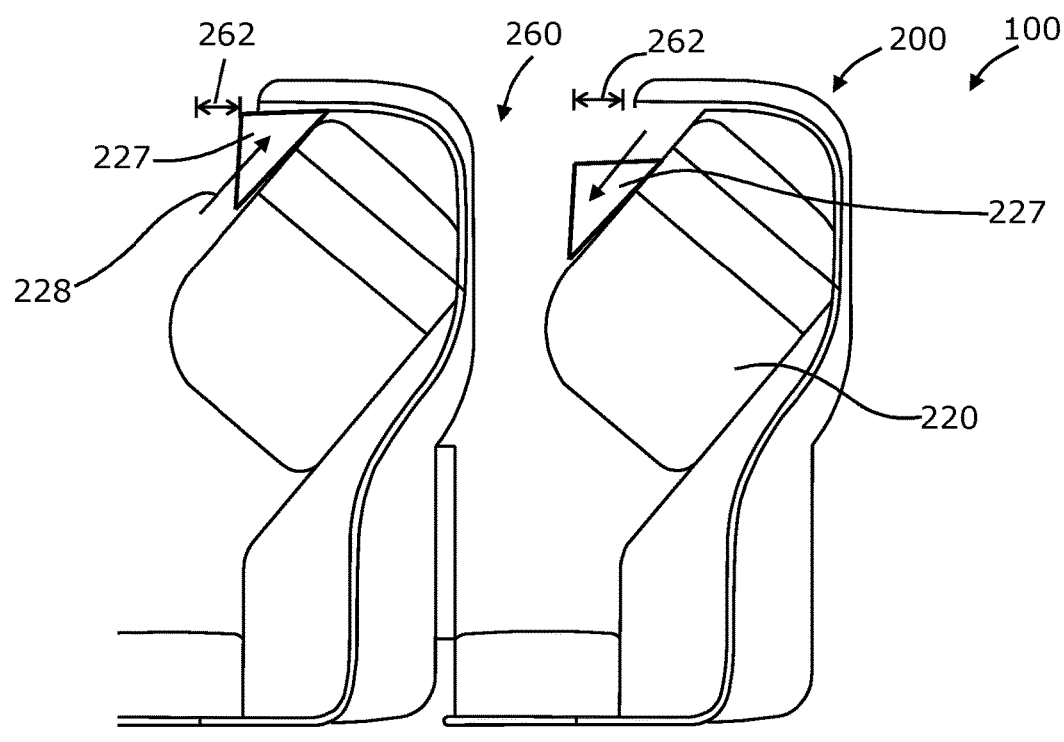
Figure 5
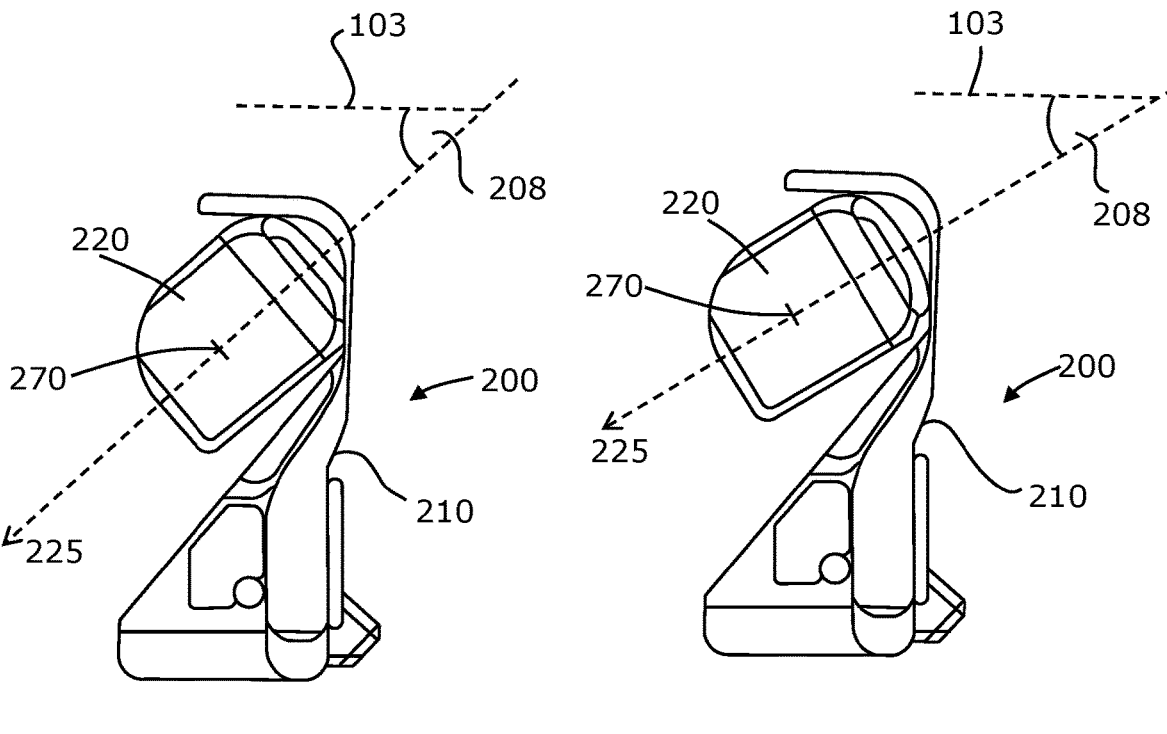
Figure 6                    Figure 7

AIRCRAFT CABIN

CROSS-REFERENCE TO RELATED APPLICATIONS

This application is a national stage application of International Patent Application No. PCT/GB2020/051943, filed on Aug. 14, 2020, and titled "An Aircraft Cabin," which is related to and claims priority to United Kingdom Patent Application No. 1911773.8, filed on Aug. 16, 2019, and titled "An Aircraft Cabin," both of which are hereby incorporated by reference in their entireties.

BACKGROUND OF THE INVENTION

The present disclosure relates to an aircraft cabin of a commercial passenger aircraft.

The present invention concerns aircraft cabins and aircraft passenger accommodation units for use in aircraft cabins. More particularly, but not exclusively, this invention concerns an aircraft cabin comprising an aisle defining an aisle axis, and a plurality of aircraft passenger seats arranged in a seat column adjacent the aisle, and accessible from the aisle, each aircraft passenger seat comprising a seat pan and a backrest with a front face defining a seat facing direction and a rear face, and each aircraft passenger seat being convertible between a seat configuration and a bed configuration.

The invention also concerns an aircraft passenger accommodation unit, an aircraft, a kit of parts and a method of providing enhanced passenger access to an aircraft passenger accommodation unit.

Aircraft passenger accommodation units, comprising a shell at least partially surrounding a seat and/or a seat convertible into a lie-flat bed, are generally only used in business and/or first class on long haul flights. This is because on long haul flights the need for privacy and/or a lie flat bed is increased. These long haul flights conventionally take place on an aircraft with more than one aisle (e.g. twin aisle), such as the Airbus A380.

Some examples of aircraft cabins and the aircraft passenger accommodation units used for these long haul flights are shown in GB2362095, US2006086864, WO03013903 and WO 2018078377.

In all of these examples, a lie-flat bed, a privacy shell and direct aisle access are provided, as is expected in business class and first class cabins. For business class seating, it is also important that a sufficiently high density of seats can be achieved, in order to make the cabin economical.

However, more recently, single-aisle (narrow bodied) aircraft, such as the Airbus A320 or the Boeing 737, with modern engines, are able to fly longer distances and may be used for flights over 5 hours in duration, for example. This makes providing aircraft passenger accommodation units on these single-aisle aircraft (comprising a shell at least partially surrounding a seat and/or a seat convertible into a lie-flat bed) advantageous.

However, this is very difficult to achieve at a reasonable seat density, especially whilst also providing direct aisle access from a single aisle to all such units, and providing a lie-flat bed and a privacy screen. It is also important to ensure that the units are accessible by disabled passengers. For example, the units should enable a wheelchair user to move directly from their wheelchair in the aisle to the seat of the unit. It is also important that the seat can be certified and so must be able to withstand a required force during TTL (taxi, take-off and landing).

The present invention seeks to mitigate the above-mentioned problems. Alternatively or additionally, the present invention seeks to provide an improved aircraft cabin and/or improved aircraft passenger accommodation unit.

SUMMARY OF THE INVENTION

The present invention provides, according to a first aspect, an aircraft cabin comprising an aisle defining an aisle axis, a plurality of aircraft passenger seats arranged in a seat column adjacent the aisle, and accessible from the aisle, each aircraft passenger seat comprising a seat pan and a backrest with a front face defining a seat facing direction and a rear face, and each aircraft passenger seat being convertible between a seat configuration and a bed configuration, wherein each aircraft passenger seat in the seat column is able to be angled away from the aisle such that the seat facing direction is at an angle of at least 30 degrees from the aisle axis and wherein each aircraft passenger seat can be in the bed configuration when at that angle.

Such an aircraft cabin is able to provide seats at reasonable density, for example, for business class seating, in a single-aisle cabin, whilst still being able to provide a lie-flat bed and a privacy screen. It is also advantageous to provide further privacy and/or a window-facing seat by having the seats angled away from the aisle.

The seat facing direction is generally perpendicular to the backrest front face and represents the direction a person would face if sat normally in the seat with their back against the backrest front face. Each seat is angled away from the aisle. In other words, the seat facing direction of each seat is directioned away from the aisle. In other words, each seat (the front face of the backrest) faces away from the aisle. In other words, the back face of the backrest faces towards the aisle. For example, each seat may face a window or cabin wall.

The seat may be able to swivel, and may be able to be in the bed configuration in a number of swivel positions of the seat. However, it is required that the seat must be able to be in the bed configuration when at the angle of 30 degrees or more to the longitudinal cabin axis. This is in comparison to the arrangement disclosed in GB 2362095, where the seat can only be in the bed configuration at a shallower (20 degree) TTL angle. In particular, in swivel positions at a greater angle from the aisle, the seat of GB '095 is in, and must be in, the seat configuration. Otherwise, the seat of GB '095 is not able to be placed in the greater angle swivel positions. It is also noted, that the seat of GB '095 must be in the fully forwards facing (0 degree) position for TTL.

It is noted that the certification requirements are different for different seat angles at TTL. For example, with a seat angle between 0 and 18 degrees, the seat is classified as forward facing. Between 18 and 30 degrees, the seat is classified as angled facing. At angles greater than 30 degrees, the set is classified as side facing. Hence, at greater than 30 degrees (side facing seats), the certification requirements are more onerous, than for seats at shallower angles (forward or angled facing) for TTL.

The cabin may have a single aisle or more than one aisle, for example the cabin may be a twin aisle cabin. The cabin may comprise such described seats along both sides of some or all of the number of aisles of the cabin. In other words, there is a plurality of aircraft passenger seats, as described above, arranged in a number of seat columns adjacent, and accessible from, one of the aisles of the cabin. For example, if there is only a single-aisle, there may be such seats either side of the aisle. For example, if it is a twin aisle cabin, there may be such seats on one or both sides of both of the aisles. The aisle (or aisles) in the cabin may be substantially parallel to a longitudinal axis of the cabin.

The bed configuration may provide a substantially flat bed surface. The bed surface may have a length greater than 183 cm, preferably greater than 191 cm, and even more preferably greater than 201 cm.

The bed surface may include a surface provided by an ottoman. The ottoman may be located within a footwell. The footwell may comprise an upper cover that provides a shelf or table surface. This shelf or table surface may be for use by and/or accessible by a passenger seated in the seat unit in front.

Preferably, each aircraft passenger seat in the seat column is angled away from the aisle such that the seat facing direction is able to be at an angle of at least 35 degrees, 40 degrees, or 45 degrees, and preferably at least 50 degrees, from the aisle axis and wherein each aircraft passenger seat can be in the bed configuration when at that angle. These greater angles provide for a greater density of seat units in the cabin, especially for a single aisle cabin. Here, the sideways dimension available for the seat units is effectively fixed (as the distance between the aisle and the window side of the cabin). Hence, by increasing the seat angle, a seat pitch can be reduced and a greater seat density achieved.

Preferably, each aircraft passenger seat in the seat column has a seat pitch, defined as the dimension along a seat column axis from a point on one aircraft passenger seat to the equivalent point on an adjacent aircraft passenger seat in the column, of less than 110 cm, and preferably less than 90 cm.

The seat column axis is defined as the axis along the seat column. This may be parallel to the aisle axis and/or the longitudinal cabin axis.

The seat pitch may be less than 100 cm or 95 cm. The seta pitch may be between 83 cm and 110 cm.

Preferably, each of the plurality of aircraft passenger seats is part of an aircraft passenger accommodation unit, the unit further comprising a shell, the shell comprising a main shell portion and a rear shell portion at least partially surrounding the rear face of the backrest, wherein the rear shell portion is moveable with respect to the main shell portion between a closed position, in which the rear shell portion blocks an access path between the aisle and the seat, and an open position, in which the rear shell portion does not block the access path between the aisle and the seat. Such a rear shell portion allows enhanced access (egress) from the aisle to the seat by a disabled passenger in a wheelchair, for example.

The access path referred to in the paragraph above may be only one of many access paths, or a smaller part of a larger access way, between the aisle and seat. For example, if the access path is part of a larger access way, the access way may be effectively enlarged by the rear shell portion being moved to the open position. For example, the access path may be 7 cm wide and the width of the access way widens from 41 cm to 48 cm when the rear shell portion moves to the open position. For example, the access path may be 5 cm wide and the width of the access way widens from 36 cm to 41 cm when the rear shell portion moves to the open position.

Importantly, when in the closed position, the access path is blocked such that there is no access (for passenger egress) from the aisle to the seat across the access path. In addition, when in the open position, the access path is not blocked such that there is access (for passenger egress) from the aisle to the seat across the access path.

By having the rear shell portion moveable, it is possible to move an element that is (or was) partially surrounding the rear face of the backrest. Hence, when in the closed position, the rear shell portion can provide a privacy screen to block off sight lines etc. near to the passenger's head/face. In the open position, an access path can be provided at a location adjacent the rear face of the backrest. This helps with access to the seat as the seat pan is then more accessible and/or the backrest is more accessible.

More preferably, the rear shell portion of each aircraft passenger seat is pivotally mounted to the main shell portion so that the rear shell portion is pivotable between the closed position and the open position.

Hence, in the closed position, the rear shell portion is adjacent the rear face of backrest and when in the open position, the rear shell portion has been pivotally moved from the open position, in a direction away from rear face of backrest.

Even more preferably, the rear shell portion is pivotally mounted to the main shell portion such that the pivot axis of the rear shell portion extends in an upright direction in relation to the seat orientation. In other words, the pivot axis extends, at least partially or substantially, in the direction of the upright backrest when in the seat configuration.

The pivot axis may be located on an opposite side of the backrest to the aisle. The rear shell portion may be moved through an angle of greater than 20 degrees, maybe less than 30 degrees, and preferably approximately 25 degrees, between the closed and open positions.

Alternatively, the pivot axis may be located on a same side of the backrest to the aisle. The rear shell portion may be moved through an angle of greater than 90 degrees, maybe to 180 degrees, between the closed and open positions. The rear shell portion may be a panel that lies adjacent and against the main shell portion when in the open position.

Alternatively, the rear shell portion is removably mounted to the main shell portion.

Preferably, each aircraft passenger seat further comprises an arm-rest adjacent the aisle, wherein the armrest is moveable with respect to the seat pan and/or backrest between a first position in which the arm-rest provides an arm-rest surface for a passenger but blocks an access path between the aisle and the seat pan, and a second position, in which the arm-rest does not block the access path.

Such an arm-rest allows access from the aisle to the seat by a disabled passenger in a wheelchair, for example.

This "arm-rest" access path is different, but may overlap with, the access path referred to above (the "rear shell portion" access path). The arm-rest access path and rear shell portion access path may both be part of the same larger access way.

The arm-rest access path may be only one of many access paths, or a smaller part of a larger access way, between the aisle and seat. For example, if the arm-rest access path is part of a larger access way, the access way may be effectively enlarged by the arm-rest being moved to the open position. For example, the arm-rest access path may be 5 cm wide and the width of the access way widens from 33 cm to 38 cm when the arm-rest moves to the open position.

Importantly, when in the closed position, the arm-rest access path is blocked such that there is no access (for passenger egress) from the aisle to the seat across the access path. In addition, when in the open position, the arm-rest access path is not blocked such that there is access (for passenger egress) from the aisle to the seat across the access path.

By having the arm-rest moveable, it is possible to move an element that is (or was) partially blocking the seat, adjacent the seat pan. Hence, when in the closed position, the arm-rest can provide an arm-rest surface for a passenger. In the open position, an access path can be provided at a location adjacent the seat pan. This helps with access to the seat as the seat pan is then more accessible.

The access way may be only 33 cm wide when the arm-rest and the rear shell portion are in the closed positions. The access way may be widened to 38 cm when the arm-rest is moved to the open position and further widened to 45 cm when the rear shell portion is moved to the open position.

Preferably, each arm-rest is slidably moveable with respect to the seat pan. For example, the arm-rest may translate forwards and backward substantially parallel to the seat facing direction. Alternatively, the arm-rest may be pivotable to move to a position where the arm-rest substantially aligns with the backrest.

Preferably, each aircraft passenger seat is rotatably mounted so as to be able to swivel about an upright axis with respect to the seat orientation, such that the seat facing direction can rotate with respect to the cabin. In other words, the upright axis extends, at least partially or substantially, in the direction of the upright backrest when in the seat configuration.

The seat may be able to swivel by greater than 20 degrees, 40 degrees or even up to 50 degrees. The seat may be able to swivel such that the seat facing direction is substantially parallel to the aisle axis and/or longitudinal cabin axis, and/or seat column axis. This may be useful for TTL. In addition, it may also allow for easier access to the seat from the aisle, especially where one side of the seat pan is able to align with and be adjacent to the aisle.

More preferably, each aircraft passenger seat is mounted to the rear shell portion so that the aircraft passenger seat is pivotally mounted to the main shell portion. Hence, the aircraft passenger seat is able to rotate with the rear shell portion with respect to the main shell portion.

The pivot axis of the seat may extend in an upright direction in relation to the seat orientation. In other words, the pivot axis extends, at least partially or substantially, in the direction of the upright backrest when in the seat configuration.

The pivot axis may be located on an opposite side of the backrest to the aisle. The seat may be moved through an angle of greater than 20 degrees, maybe less than 30 degrees, and preferably approximately 25 degrees.

Preferably, the backrest is pivotally mounted to the seat pan and able to pivotally lower with respect to the seat pan to form a substantially flat surface with the seat pan, whilst the seat pan is stationary with respect to the cabin. In other words, the backrest is able to be reclined to the bed configuration (to provide a substantially flat bed surface) without the seat pan moving forwards, for example.

Preferably, the seat pan is shaped such that a front corner of the seat pan adjacent the aisle is more rounded than an opposite front corner of the seat pan not-adjacent the aisle. This provides easier access to the seat from the aisle. For example, the aisle side corner of the seat pan may have a larger radius of curvature than the non-aisle side corner of the seat pan.

According to a second aspect of the invention there is also provided an aircraft passenger accommodation unit, for location in an aircraft cabin, adjacent an aisle, the unit comprising an aircraft passenger seat comprising a seat pan and a backrest with a front face defining a seat facing direction and a rear face, and the aircraft passenger seat being convertible between a seat configuration and a bed configuration, and a shell, the shell comprising a main shell portion and a rear shell portion at least partially surrounding the rear face of the backrest, wherein the rear shell portion is moveable with respect to the main shell portion between a closed position, in which the rear shell portion blocks an access path between the aisle and the seat, and an open position, in which the rear shell portion does not block the access path between the aisle and the seat. Such a rear shell portion allows enhanced access from the aisle to the seat by a disabled passenger in a wheelchair, for example.

The access path referred to in the paragraph above may be only one of many access paths, or a smaller part of a larger access way, between the aisle and seat. For example, if the access path is part of a larger access way, the access way may be effectively enlarged by the rear shell portion being moved to the open position. For example, the access path may be 7 cm wide and the width of the access way widens from 41 cm to 48 cm when the rear shell portion moves to the open position. For example, the access path may be 5 cm wide and the width of the access way widens from 36 cm to 41 cm when the rear shell portion moves to the open position.

Importantly, when in the closed position, the access path is blocked such that there is no access (for passenger egress) from the aisle to the seat across the access path. In addition, when in the open position, the access path is not blocked such that there is access (for passenger egress) from the aisle to the seat across the access path.

By having the rear shell portion moveable, it is possible to move an element that is (or was) partially surrounding the rear face of the backrest. Hence, when in the closed position, the rear shell portion can provide a privacy screen to block off sight lines etc. near to the passenger's head/face. In the open position, an access path can be provided at a location adjacent the rear face of the backrest. This helps with access to the seat as the seat pan is then more accessible and/or the backrest is more accessible.

The seat facing direction is generally perpendicular to the backrest front face and represents the direction a person would face if sat normally in the seat with their back against the backrest front face.

Preferably, each aircraft passenger seat is arrangeable to be angled away from the aisle such that the seat facing direction is at an angle of at least 30 degrees, 35 degrees, 40 degrees, or preferably at least 45 degrees, and more preferably at least 50 degrees, from an aisle axis and wherein each aircraft passenger seat can be in the bed configuration when at that angle.

Such a seat is able to provide a cabin with seats at reasonable density, for example, for business class seating, in a single-aisle cabin, whilst still being able to provide a lie-flat bed and a privacy screen. It is also advantageous to provide further privacy and/or a window-facing seat by having the seats angled away from the aisle. Hence, by increasing the seat angle, a seat pitch can be reduced and a greater seat density achieved.

The seat may be able to swivel, and may be able to be in the bed configuration in a number of swivel positions of the seat. However, it is required that the seat must be able to be in the bed configuration when at the angle of 30 degrees or more to the aisle. This is in comparison to the arrangement disclosed in GB 2362095, as described above.

The bed configuration may provide a substantially flat bed surface. The bed surface may have a length greater than 183 cm, preferably greater than 191 cm, and even more preferably greater than 201 cm.

The bed surface may include a surface provided by an ottoman. The ottoman may be located within a footwell. The footwell may comprise an upper cover that provides a shelf or table surface. This shelf or table surface may be for use by and/or accessible by a passenger seated in a seat unit in front.

Preferably, each aircraft passenger seat has a seat pitch, defined as the dimension from a point on the aircraft passenger seat to an opposite point of the aircraft passenger seat, of less than 105 cm, and preferably less than 90 cm. The opposite point may be across the seat unit in the direction of a column axis of a plurality of the seats arranged in a column.

The seat pitch may be less than 100 cm or 95 cm.

Preferably, the rear shell portion of the aircraft passenger seat is pivotally mounted to the main shell portion so that the rear shell portion is pivotable between the closed position and the open position.

Hence, in the closed position, the rear shell portion is adjacent the rear face of backrest and when in the open position, the rear shell portion has been pivotally moved from the open position, in a direction away from rear face of backrest.

Even more preferably, the rear shell portion is pivotally mounted to the main shell portion such that the pivot axis of the rear shell portion extends in an upright direction in relation to the seat orientation. In other words, the pivot axis extends at least partially or substantially in the direction of the upright backrest when in the seat configuration.

The pivot axis may be located on an opposite side of the backrest to an aisle. The rear shell portion may be moved through an angle of greater than 20 degrees, maybe less than 30 degrees, and preferably approximately 25 degrees, between the closed and open positions.

Alternatively, the pivot axis may be located on a same side of the backrest to the aisle. The rear shell portion may be moved through an angle of greater than 90 degrees, may be to 180 degrees, between the closed and open positions. The rear shell portion may be a panel that lies adjacent and against the main shell portion when in the open position.

Alternatively, the rear shell portion is removably mounted to the main shell portion.

Preferably, each aircraft passenger seat further comprises an arm-rest arrangeable to be adjacent an aisle, wherein the armrest is moveable with respect to the seat pan and/or backrest between a first position in which the arm-rest provides an arm-rest surface for a passenger but blocks an access path between the aisle and the seat pan, and a second position, in which the arm-rest does not block the access path.

Such an arm-rest allows access from the aisle to the seat by a disabled passenger in a wheelchair, for example.

This "arm-rest" access path is different, but may overlap with, the access path referred to above (the "rear shell portion" access path). The arm-rest access path and rear shell portion access path may both be part of the same larger access way.

The arm-rest access path may be only one of many access paths, or a smaller part of a larger access way, between the aisle and seat. For example, if the arm-rest access path is part of a larger access way, the access way may be effectively enlarged by the arm-rest being moved to the open position. For example, the arm-rest access path may be 5 cm wide and the width of the access way widens from 33 cm to 38 cm when the arm-rest moves to the open position.

Importantly, when in the closed position, the arm-rest access path is blocked such that there is no access (for passenger egress) from the aisle to the seat across the access path. In addition, when in the open position, the arm-rest access path is not blocked such that there is access (for passenger egress) from the aisle to the seat across the access path.

By having the arm-rest moveable, it is possible to move an element that is (or was) partially blocking the seat, adjacent the seat pan. Hence, when in the closed position, the arm-rest can provide an arm-rest surface for a passenger. In the open position, an access path can be provided at a location adjacent the seat pan. This helps with access to the seat as the seat pan is then more accessible.

The access way may be only 33 cm wide when the arm-rest and the rear shell portion are in the closed positions. The access way may be widened to 38 cm when the arm-rest is moved to the open position and further widened to 45 cm when the rear shell portion is moved to the open position.

Preferably, each arm-rest is slidably moveable with respect to the seat pan. For example, the arm-rest may translate forwards and backward substantially parallel to the seat facing direction. Alternatively, the arm-rest may be pivotable to move to a position where the arm-rest substantially aligns with the backrest.

Preferably, each aircraft passenger seat is rotatably mounted so as to be able to swivel about an upright axis with respect to the seat orientation, such that the seat facing direction can rotate with respect to the cabin. In other words, the upright axis extends at least partially or substantially in the direction of the upright backrest when in the seat configuration.

The seat may be able to swivel by greater than 20 degrees, 40 degrees or even up to 50 degrees. The seat may be able to swivel such that the seat facing direction is substantially parallel to the aisle axis and/or longitudinal cabin axis, and/or seat column axis. This may be useful for TTL. In addition, it may also allow for easier access to the seat from the aisle, especially where one side of the seat pan is able to align with and be adjacent to the aisle.

More preferably, each aircraft passenger seat is mounted to the rear shell portion so that the aircraft passenger seat is pivotally mounted to the main shell portion. Hence, the aircraft passenger seat is able to rotate with the rear shell portion with respect to the main shell portion.

The pivot axis of the seat may extend in an upright direction in relation to the seat orientation. In other words, the pivot axis extends at least partially or substantially in the the direction of the upright backrest when in the seat configuration.

The pivot axis may be located on an opposite side of the backrest to the aisle. The seat may be moved through an angle of greater than 20 degrees, maybe less than 30 degrees, and preferably approximately 25 degrees.

Preferably, the backrest is pivotally mounted to the seat pan and able to pivotally lower with respect to the seat pan to form a substantially flat surface with the seat pan, whilst the seat pan is stationary with respect to the cabin. In other words, the backrest is able to be reclined to the bed configuration (to provide a substantially flat bed surface) without the seat pan moving forwards, for example.

Preferably, the seat pan is shaped such that a front corner of the seat pan adjacent the aisle is more rounded than an opposite front corner of the seat pan not-adjacent the aisle. This provides easier access to the seat from the aisle. For example, the aisle side corner of the seat pan may have a larger radius of curvature than the non-aisle side corner of the seat pan.

According to a third aspect of the invention there is also provided an aircraft comprising the aircraft cabin or aircraft passenger accommodation unit described above.

According to a fourth aspect of the invention there is also provided a kit of parts for assembling the aircraft passenger accommodation unit, aircraft cabin or aircraft described above.

According to a fifth aspect of the invention there is also provided a method of providing enhanced passenger access to an aircraft passenger accommodation unit adjacent an aisle of an aircraft cabin, the aircraft passenger accommodation unit comprising an aircraft passenger seat and a shell, the method comprising the step of moving a rear shell portion of the shell from a closed position, in which the rear shell portion blocks an access path between the aisle and the seat, and an open position, in which the rear shell portion does not block the access path between the aisle and the seat.

The rear shell portion at least partially surrounds the rear face of the backrest. The rear shell portion is moveable with respect to a main shell portion of the shell.

Preferably, the method further comprises the step of moving an arm-rest of the aircraft passenger seat between a first position in which it provides an arm-rest surface for a passenger but blocks an access path between the aisle and the seat pan, and a second position, in which it does not block the access path.

Preferably, the method further comprises the step of swivelling the aircraft passenger seat such that a seat facing direction is rotated with respect to the cabin.

Preferably, the method further comprises the step of pivotally lowering the backrest with respect to the seat pan to form a substantially flat surface with the seat pan, whilst the seat pan is stationary with respect to the cabin.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which:

FIG. 5 shows a schematic plan view of two aircraft passenger accommodation units that may be used with the aircraft cabin of the first, second or third embodiments;

FIG. 6 shows a schematic plan view of an aircraft passenger accommodation unit that may be used with the aircraft cabin of the first, second or third embodiments, with the aircraft passenger seat swivelled to an angle of 45 degrees to the aisle axis;

FIG. 7 shows a schematic plan view of the aircraft passenger accommodation unit of FIG. 6, with the aircraft passenger seat swivelled to an angle of 30 degrees to the aisle axis;

DETAILED DESCRIPTION

Figures 1, 2:
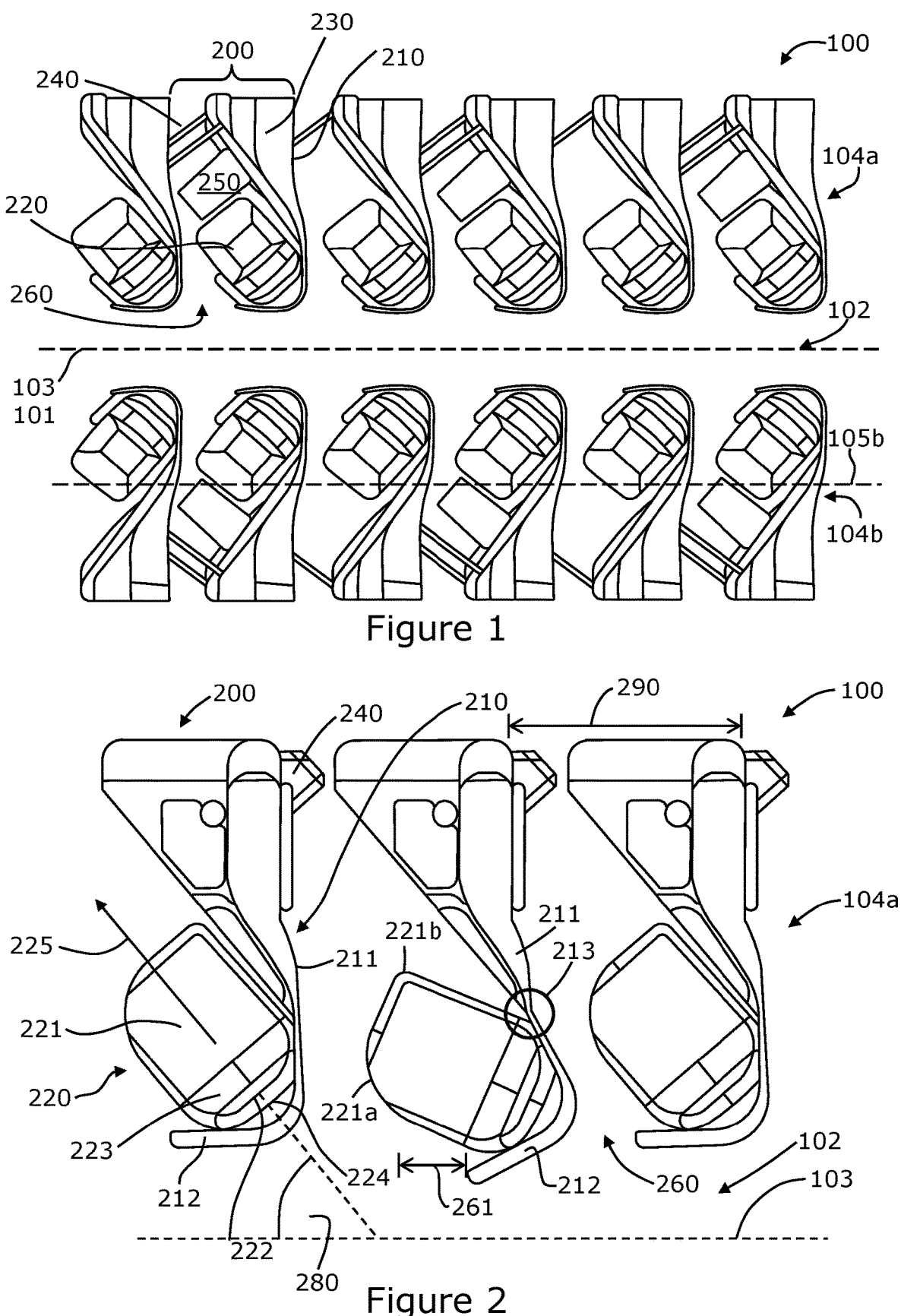
FIG. 1 shows a plan view of an aircraft cabin, including aircraft passenger accommodation units, according to a first embodiment of the invention.
FIG. 2 shows a schematic plan view of part of the aircraft cabin of FIG. 1.

FIG. 1 shows a plan view of an aircraft cabin 100, including aircraft passenger accommodation units 200, according to a first embodiment of the invention.

The cabin 100 has a central longitudinal cabin axis 101. The cabin 100 has a central single aisle 102. The aisle defines an aisle axis 103, which is the same as the cabin axis 101. There is a seat column 104 on either side of the aisle 102. The first seat column 104a (shown as the upper column, above the aisle, as viewed in FIG. 1) is on the right hand side of the cabin when facing forwards towards the front of the aircraft cabin (i.e. in the flight direction). The second seat column 104b (shown as the lower column, beneath the aisle, as viewed in FIG. 1) is on the left hand side of the cabin when facing forwards towards the front of the aircraft cabin (i.e. in the flight direction). Each seat column defines a seat column axis 105, extending along the axis of the seat column, only the column axis 105b being shown, for clarity. The seat column axes 105 are parallel to the cabin axis 101 and aisle axis 103.

In each seat column 104, there are a number of aircraft passenger accommodation units 200, six shown in each column in FIG. 1. The units 200 are located abutting each other so as to form the seat columns 105. The units 200 are substantially identical and so, in the following, only one will be described.

The unit 200 comprises a seat 220 and a shell 210. The seat 220 is orientated facing away from the aisle 102, towards windows (not shown) of the cabin 100. The shell 210 extends around the back of the seat 220, adjacent the aisle 103 and then extends substantially perpendicular to the cabin 101 and aisle 103 axes towards the outside (windows) of the cabin.

The unit 200 also comprises a console 230 provided on the inner (seat) side of the shell 210, in front of the seat 220. This console 230 provides storage space for a passenger of the unit and also houses a deployable table 250 for use by the passenger. A footwell 240, comprising an ottoman, is provided attached to the outer (behind the seat) side of the shell 210. The footwell 240 is for use by the passenger using the seat unit 200 behind. An upper surface of the footwell 240 provides a table or shelf for use by the passenger using the seat unit (in front).

As shown in FIG. 1, the seat 220 is in the seat configuration. It can also be moved to a bed configuration (not shown) in which the backrest 222 is pivotally lowered in relation to the seat pan 221 and the seat pan 221 is moved forwards in the unit to near the footwell 240, to provide a flat bed surface. The bed length (from the far end of the footwell 240 to the top of a headrest 226 of the backrest 222 is 202 cm.

Each unit 200 is accessed by an access way 260 adjacent the aisle in between the shell of the unit in front and the shell 210 of the relevant unit 200. The access way is 39 cm wide.

FIG. 2 shows a schematic plan view of three of the units 200 of the right hand column 104a of the aircraft cabin of FIG. 1. Here, more details of the units 200 are shown and will be described, in relation to a single unit.

Here, the seat pitch 290 of a unit 200 is shown. This is the dimension, in the seat column axis 105 direction, of the unit 200. Here it is shown measured from the back of one shell 210 adjacent the windows of the cabin 100 to the equivalent point on the unit behind. This seat pitch dimension is 89 cm.

Each seat 220 comprises a seat pan 221 and a backrest 222. The backrest has a front face 223 and a back face 224. The front face 223 defines the seat facing direction 225 (perpendicular to the front face 223). As shown for the left-most unit 200 in FIG. 2, where the unit is arranged for TTL (taxi, take-off and landing), this seat facing direction 225 is at an angle 280 to the aisle axis 103. This angle 280 is 49.5 degrees.

The seat pan 221, as labelled for the middle unit 200 of FIG. 2, is generally rectangular with two front corners that are rounded. The front corner 221a that is nearest the aisle 102 is more rounded that the opposite front corner 221b. This aids access to the seat 220 from the aisle 102 as by being more rounded, it extends less far towards the back of the shell 210 in front. Hence, a pathway into the unit against the back of the shell in front is wider.

The shell 210 is divided into two parts; a main shell portion 211 and a rear shell portion 212. The rear shell portion 212 is pivotally mounted to the main shell portion about a generally upright pivot axis 213. The pivot axis 213 is located on the opposite side of the backrest 222 to the aisle 102. The rear shell portion 212 forms a corner shell which extends around the back face 224 of the backrest 222. A first half of the corner shell extends along a non-aisle side of the backrest to the aisle 102, to behind the middle of the seat 220. A second half of the corner shell extends along the aisle 102, to the other side of the seat 220, near the aisle-side of the backrest 222.

For the left and right units, as shown in FIG. 2, the rear shell portion 212 is in its closed position, with the first half of the corner shell in line with the main shell portion 211 and the second half of the corner shell extending parallel to the aisle 102.

For the middle unit, as shown in FIG. 2, the rear shell portion 212 has been moved to its open position, by pivoting the rear shell portion 212 by an angle of 25 degrees at pivot axis 213. Hence, the rear shell portion 212 has encroached backwards into the access way 260 of the unit behind and also moved into the aisle 102. Importantly, as the rear shell portion 212 has moved, there is an access path 261 that was blocked by the rear shell portion 212 in the closed position, which is now not blocked in the open position. This access path 261 is 5 cm wide. Hence, by opening the rear shell portion 212, access (egress) to the seat 222 from the aisle 102, especially for disabled passengers, is improved. The access way available is now 44 cm wide.

As can be seen in the middle unit 200 of FIG. 2, the seat 220 is mounted to the rear shell portion 212 and so also rotates by 25 degrees as the rear shell portion is moved to the open position. Hence, the seat 220 in the middle unit is at an angle of 24.5 degrees to the aisle axis 103.

Figures 3, 4:
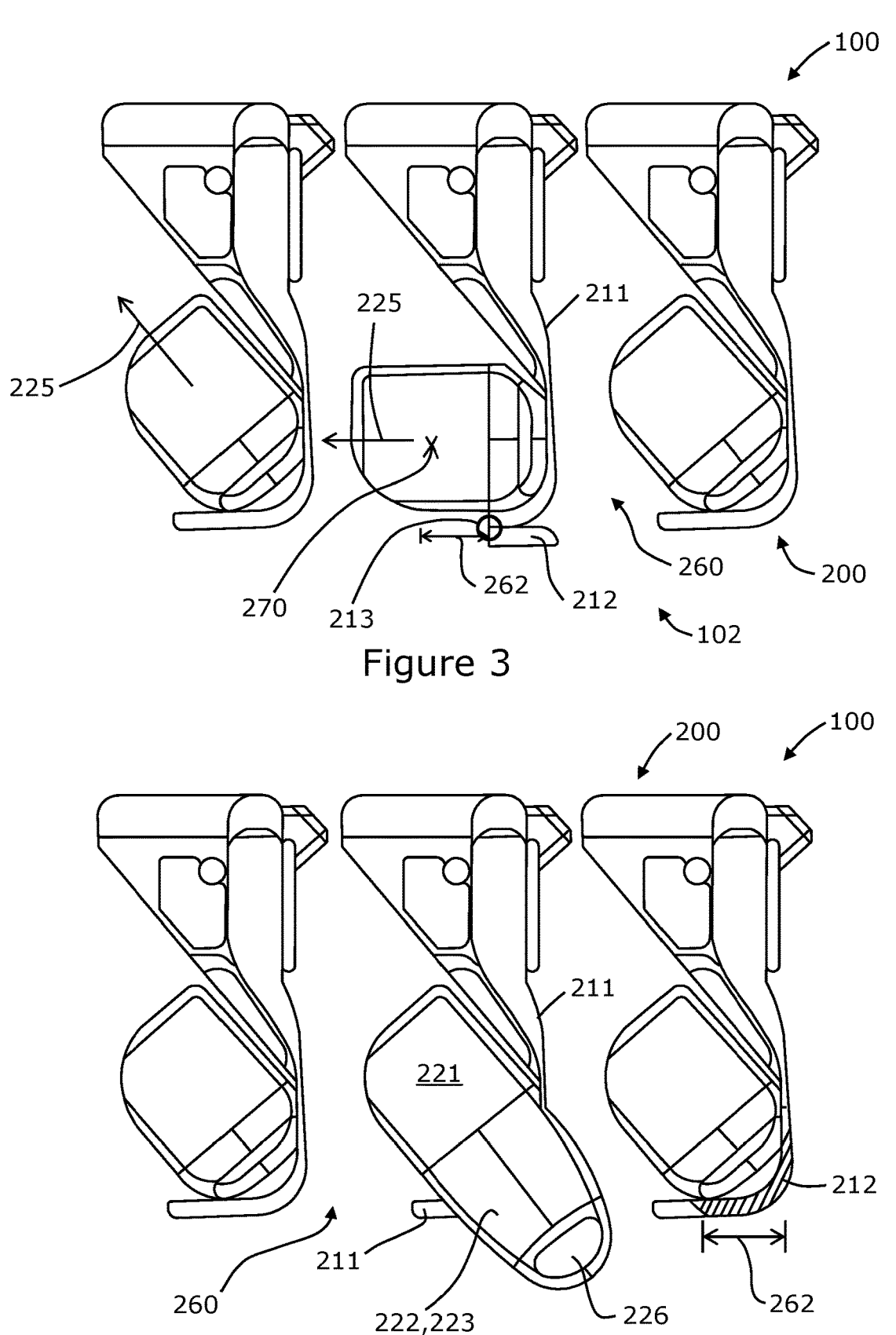
FIG. 3 shows a schematic plan view of part of an aircraft cabin according to a second embodiment of the invention.
FIG. 4 shows a schematic plan view of part of an aircraft cabin according to a third embodiment of the invention.

FIG. 3 shows a schematic plan view of part of an aircraft cabin according to a second embodiment of the invention. This cabin is similar to the cabin of FIGS. 1 and 2 and so the same reference numerals will be used, for like elements. Only aspects of the second embodiment that differ from the first embodiment will be described. All other aspects are the same as the first embodiment.

In this embodiment, shell 210 is divided into the two parts at a different location. Namely, the rear shell portion 212 is pivotally mounted to the main shell portion 211 at a upright pivot axis 213 that is located adjacent the aisle 102, at a region where the aisle side of the backrest 222 is adjacent the shell 210, when the seat facing direction 225 is at 49.5 degrees to the aisle axis 103.

The rear shell portion 212 is able to pivot back by 180 degrees in relation to the main shell portion 211, to an open position as shown in the middle unit of FIG. 3, such that it lies against and abuts against the main shell portion 211.

The seat 220 is not mounted to the rear shell portion 212 and instead is rotatable about a swivel axis 270 located on the centre of the seat pan 221.

When enhanced seat access is required, the rear shell portion 212 is pivoted to the open position, and the seat 220 is pivoted about the swivel axis 270 such that the seat facing direction 225 is parallel to the aisle axis 103 (forwards facing direction). This provides an additional access path 262 from which to access the seat 220 from the aisle 102. This access path 262 is 7 cm wide. Hence, the access way to the seat is increased from 39 cm to 46 cm.

The seat 220 could also be pivoted to the forwards facing direction for TTL.

FIG. 4 shows a schematic plan view of part of an aircraft cabin according to a third embodiment of the invention. This cabin is similar to the cabin of FIGS. 1 and 2 and so the same reference numerals will be used, for like elements. Only aspects of the third embodiment that differ from the first embodiment will be described. All other aspects are the same as the first embodiment.

In this embodiment, shell 210 is divided into the two parts at a different location. In addition, the rear shell portion 212 is removable from the main shell portion 211. The seat 220 is not mounted to the rear shell portion 212.

As shown by hatched lines in the right-most unit 200 of FIG. 4, the rear shell portion 212 is removed to provide a gap in the shell 210 behind the backrest 222. The backrest 222 can then be pivoted in relation to the seat pan 221 to lower through the gap to be in the aisle 102. When the backrest 222 is lowered in this way, the seat pan 221 is not moved forwards in the unit. In other words, this movement is different to the movement of the seat 220 into a bed configuration where the seat pan 220 moves forwards to near the footwell 240.

When enhanced seat access is required, the rear shell portion 212 is removed and the backrest 22 lowered. This provides an additional access path 262 from which to access the seat 220 from the aisle 102. This access path 262 is 7 cm wide. In addition, it is noted that the end section of the main shell portion 211 is at low height and so the width of the access way provided above the level of the seat pan 221 is actually 86 cm.

FIG. 5 shows a schematic plan view of two aircraft passenger accommodation units 200 that may be used with the aircraft cabin 100 of the first, second or third embodiments, or any alternative of them.

FIG. 5 shows the seat 220 provided with an arm-rest 227 on the aisle-side of the seat. The arm-rest 227 is triangular in shape and is translatable forwards and backwards in the seat facing direction 225. This movement is shown by arrow 228. Is it move forwards in the unit on the right of FIG. 5 and moved backwards in the unit on the left of FIG. 5. When the arm-rest 227 is moved backwards, is unblocks an access path 262 which is blocked in the forwards position. The access path 262 has a width of 3 cm and so it can be seen that this widens the access way 260 and enhances access to the seat pan 221 from the aisle 102.

FIG. 6 shows a schematic plan view of an aircraft passenger accommodation unit 200 that may be used with the aircraft cabin of the first, second or third embodiments, with the aircraft passenger seat 220 swivelled to an angle of 45 degrees to the aisle axis 103. Here, the seat facing direction 225 is at an angle 208 of 45 degrees to the aisle axis 103. In other words, the seat has been swivelled about swivel axis 270 by 4.5 degrees towards the aisle 102. This may be done to enhance access and/or for TTL.

FIG. 7 shows a schematic plan view of the aircraft passenger accommodation unit 200 of FIG. 6, with the aircraft passenger seat 220 swivelled to an angle of 30 degrees to the aisle axis 103. Here, the seat facing direction 225 is at an angle 208 of 30 degrees to the aisle axis 103. In other words, the seat has been swivelled about swivel axis 270 by 15 degrees (from FIG. 6) towards the aisle 102. This may be done to enhance access and/or for TTL.

Figure 8:
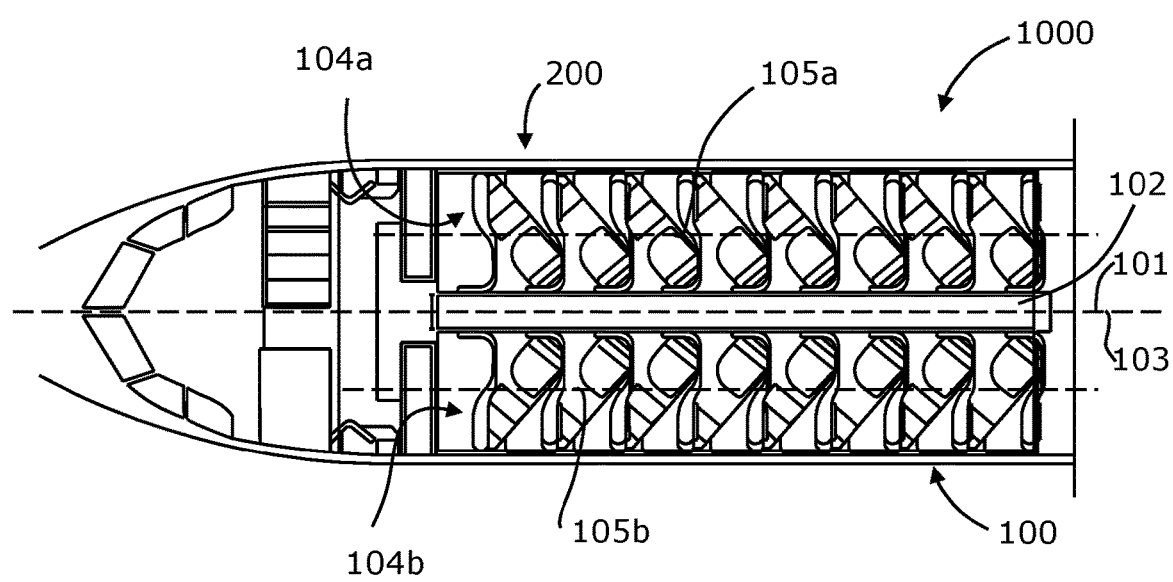
FIG. 8 shows a schematic plan view of an aircraft including the aircraft cabin of the first, second or third embodiments.

FIG. 8 shows a schematic plan view of an aircraft 1000 including the aircraft cabin 100 of the first, second or third embodiments.

It can be seen that there are eight units 20 either side of a single aisle 102, in two seat columns 104a, 104b. The aircraft is an Airbus A320.

Figure 9:
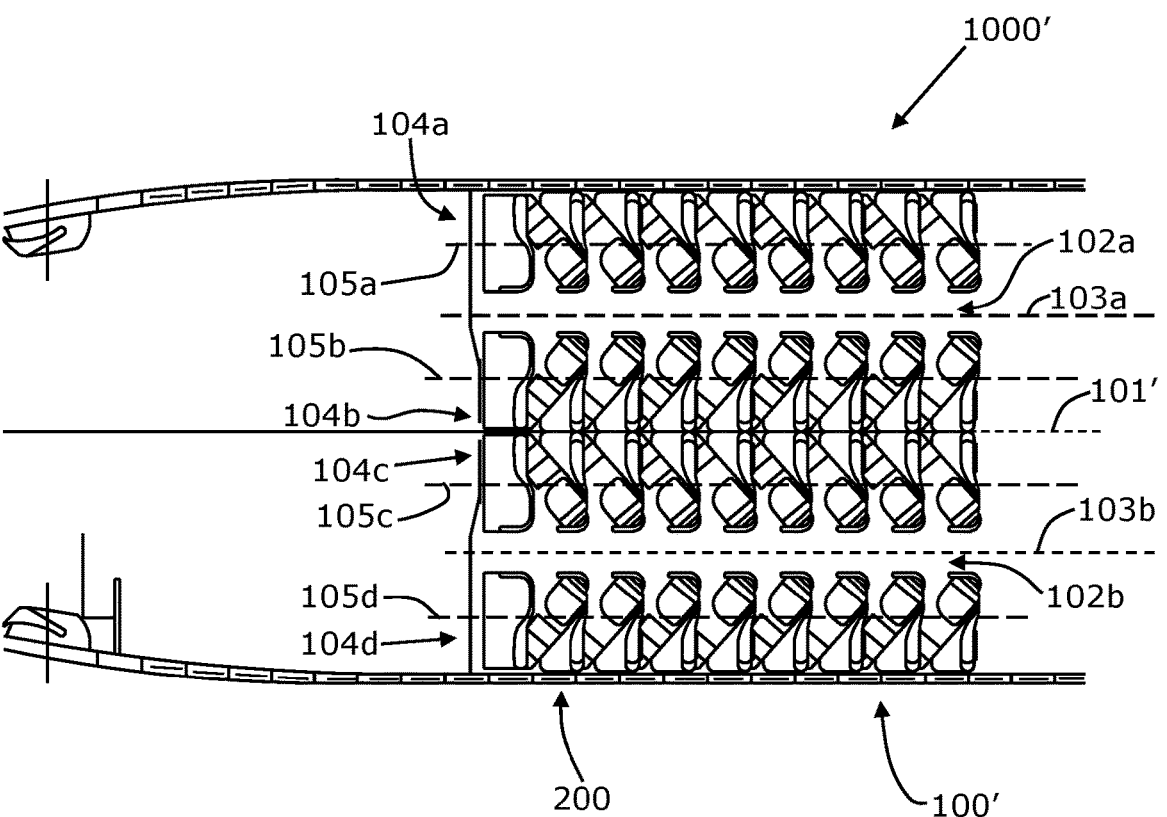
FIG. 9 shows a schematic plan view of a different aircraft including aircraft passenger accommodation units of the first, second or third embodiments.

FIG. 9 shows a schematic plan view of a different aircraft 1000' including aircraft passenger accommodation units 200 of the first, second or third embodiments. This aircraft 1000' is similar to the aircraft 1000 of FIG. 8 and the same reference numerals will be used, for like elements. Where elements differ, the same reference numerals with 'may be used. Only aspects of this aircraft 1000' that differ from aircraft 1000 will be described. All other aspects are the same.

Here, the aircraft 1000' is a twin aisle 102a, 102b Boeing 777 aircraft. The cabin 100' has four seat columns 104a, 140b, 140c, 140d. A first right side seat column 104a is against the right hand side of the cabin (when facing in the flight direction of the aircraft) and defines a seat column axis 105a. A second right central seat column 104b is on the other side of the first aisle 102a to the first right side seat column 104a and lies against the aircraft cabin axis 101'. It defines a seat column axis 105b. A third left central seat column 104c is on the other side of the cabin column axis 101' to the second right central seat column 104b and abuts against the aircraft cabin axis 101'. It defines a seat column axis 105c. A fourth left side seat column 104d is against the left hand side of the cabin, on the opposite side of the second aisle 102b to the third left central seat column 104c. It defines a seat column axis 105d.

Units 200 are arranged in the four seat columns, with seats facing away from the aisles 102a, 102b, just as in FIG. 8.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In the third embodiment, the seat 220 may be rotatable about a swivel axis 270, for example located in the centre of the seat pan 221.

Any suitable dimensions (e.g. bed length, access path and access way widths, seat pitch) and angles (e.g. angle of seat facing direction to aisle axis, swivel angle, rear shell portion movement angle) may be used.

The pivot axis locations (e.g. pivot axis 213, swivel axis 270) may be in any suitable location.

As an alternative, rather than being translatable, the arm-rest may be pivotable in relation to the backrest 222 so it can substantially align with the backrest 222 and so provide an access path 262 between the aisle and seat pan 221.

A moveable door may or may not be provided across the access way 260.

The upper surface of the footwell 240 may be for use by the passenger using the seat unit behind (rather than in front).

In a twin-aisle aircraft, such as an Airbus A330 or a Boeing 787, there may only three seat columns. In particular, the arrangement is likely to be equivalent to the arrangement of FIG. 9 with one of the second or third right/left central seat columns 104b, 104c removed and the aisles and seat columns evenly spaced out within the width of the cabin 100'.

The aisle axis, cabin axis and seat column axis may be non-parallel.

The aircraft may be any suitable aircraft such as a Boeing 737 (single aisle) or a Boeing 787, Airbus A350, Airbus A330, Boeing 747 or Airbus A380 (twin aisle).

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

It should be noted that throughout this specification, "or" should be interpreted as "and/or".

The invention claimed is:

1. An aircraft cabin comprising:

an aisle defining an aisle axis, a plurality of aircraft passenger seats arranged in a seat column adjacent the aisle, and accessible from the aisle, each aircraft passenger seat comprising a seat pan and a backrest with a front face defining a seat facing direction and a rear face, and each aircraft passenger seat being convertible between a seat configuration and a bed configuration, wherein the rear face of the backrest faces towards the aisle, wherein each aircraft passenger seat in the seat column is able to be angled away from the aisle such that the seat facing direction is at an angle of at least 30 degrees from the aisle axis, wherein each aircraft passenger seat can be in the bed configuration when at that angle, and wherein each of the plurality of aircraft passenger seats is part of an aircraft passenger accommodation unit, the unit further comprising a shell, the shell comprising a main shell portion and a rear shell portion at least partially surrounding the rear face of the backrest, wherein the rear shell portion is moveable with respect to the main shell portion between a closed position, in which the rear shell portion blocks an access path between the aisle and the seat, and an open position, in which the rear shell portion does not block the access path between the aisle and the seat, wherein, when the rear shell portion is in the closed position, the rear shell portion is adjacent the rear face of the backrest, and wherein, when the rear shell portion is in the open position, the rear shell portion is pivotally moved from the closed position in a direction away from the rear face of the backrest.

2. An aircraft cabin as claimed in claim 1, wherein each aircraft passenger seat in the seat column is angled away from the aisle such that the seat facing direction is able to be at an angle of at least one of 35 degrees, 40 degrees, 45 degrees, or at least 50 degrees, from the aisle axis and wherein each aircraft passenger seat can be in the bed configuration when at that angle.

3. An aircraft cabin as claimed in claim 1, wherein each aircraft passenger seat in the seat column has a seat pitch, defined as a dimension along a seat column axis from a point on one aircraft passenger seat to an equivalent point on an adjacent aircraft passenger seat in the column, of less than 110 cm, or less than 90 cm.

4. An aircraft cabin as claimed in claim 1, wherein the rear shell portion of each aircraft passenger seat is pivotally mounted to the main shell portion so that the rear shell portion is pivotable between the closed position and the open position.

5. An aircraft cabin as claimed in claim 4, wherein the rear shell portion is pivotally mounted to the main shell portion such that a pivot axis of the rear shell portion extends in an upright direction in relation to the seat orientation.

6. An aircraft cabin as claimed in claim 1, wherein the rear shell portion is removably mounted to the main shell portion.

7. An aircraft cabin as claimed in claim 1, wherein each aircraft passenger seat further comprises an arm-rest adjacent the aisle, wherein the armrest is moveable with respect to the seat pan and/or backrest between a first position in which the arm-rest provides an arm-rest surface for a passenger but blocks an access path between the aisle and the seat pan, and a second position, in which the arm-rest does not block the access path.

8. An aircraft cabin as claimed in claim 7, wherein each arm-rest is slidably moveable with respect to the seat pan.

9. An aircraft cabin as claimed in claim 1, wherein each aircraft passenger seat is rotatably mounted so as to be able to swivel about an upright axis with respect to the seat orientation, such that the seat facing direction can rotate with respect to the cabin.

10. An aircraft cabin as claimed in claim 4, wherein each aircraft passenger seat is rotatably mounted so as to be able to swivel about an upright axis with respect to the seat orientation, such that the seat facing direction can rotate with respect to the cabin, and wherein each aircraft passenger seat is mounted to the rear shell portion so that the aircraft passenger seat is pivotally mounted to the main shell portion.

11. An aircraft cabin as claimed in claim 1, wherein the backrest is pivotally mounted to the seat pan and able to pivotally lower with respect to the seat pan to form a substantially flat surface with the seat pan, whilst the seat pan is stationary with respect to the cabin.

12. An aircraft cabin as claimed in claim 1, wherein the seat pan is shaped such that a front corner of the seat pan adjacent the aisle comprises a radius of curvature larger than an opposite front corner of the seat pan not-adjacent the aisle.

13. An aircraft comprising the aircraft cabin or aircraft passenger accommodation unit of claim 1.

\* \* \* \* \*